United States Patent
Aaltonen et al.

(10) Patent No.: US 11,880,396 B2
(45) Date of Patent: Jan. 23, 2024

(54) METHOD AND SYSTEM TO PERFORM TEXT-BASED SEARCH AMONG PLURALITY OF DOCUMENTS

(71) Applicant: Arctic Alliance Europe Oy, Turku (FI)

(72) Inventors: Janne Aaltonen, Turku (FI); Jari Majaniemi, Turku (FI)

(73) Assignee: Arctic Alliance Europe Oy, Turku (FI)

( * ) Notice: Subject to any disclaimer, the term of this patent is extended or adjusted under 35 U.S.C. 154(b) by 367 days.

(21) Appl. No.: 17/283,336

(22) PCT Filed: Oct. 8, 2019

(86) PCT No.: PCT/IB2019/058552
§ 371 (c)(1),
(2) Date: Apr. 7, 2021

(87) PCT Pub. No.: WO2020/075062
PCT Pub. Date: Apr. 16, 2020

(65) Prior Publication Data
US 2021/0382924 A1    Dec. 9, 2021

(30) Foreign Application Priority Data

Oct. 8, 2018   (IN) .............................. 201811038053
Oct. 8, 2018   (IN) .............................. 201811038054

(51) Int. Cl.
*G06F 16/33*   (2019.01)
*G06F 16/35*   (2019.01)
(Continued)

(52) U.S. Cl.
CPC ........ *G06F 16/3331* (2019.01); *G06F 16/338* (2019.01); *G06F 16/3329* (2019.01);
(Continued)

(58) Field of Classification Search
CPC ............... G06F 16/3331; G06F 16/353; G06F 16/3329; G06F 16/3341; G06F 16/338; G06F 18/214; G06N 20/00
See application file for complete search history.

(56) References Cited

U.S. PATENT DOCUMENTS 7,707,220 B2 *   4/2010   Bonabeau ........... G06F 16/9535
                                                 707/758
8,200,687 B2 *   6/2012   Gupta ................. G06F 16/2425
                                                 707/769
(Continued)

FOREIGN PATENT DOCUMENTS

JP    H03131970 A    6/1991
WO   2008008142 A2   1/2008

OTHER PUBLICATIONS

Intellectual Property India, Examination report under sections 12 & 13 of the Patents Act, 1970 and the Patents Rules, 2003., Application No. 201811038054, dated Nov. 25, 2022, 6 pages.
(Continued)

*Primary Examiner* — Mark E Hershley
(74) *Attorney, Agent, or Firm* — Ziegler IP Law Group (57) ABSTRACT

A method for training system to perform text-based search among plurality of documents. The method including receiving starting document, having at least one reference-identifier associated with the document; selecting reference-text from starting document; generating search-string by using a plurality of keywords using at least one first machine learning algorithm and at least one search-operator using at least one second machine learning algorithm; performing search among plurality of documents using search-string to fetch set of relevant documents; deriving reference-identifier distribution, corresponding to the at least one reference-identifier associated with document, for the set of relevant documents; and corelating at least one reference-identifier
(Continued)

associated with starting document with reference-identifier distribution to determine performance-score for system. The steps of method are iteratively performed until performance-score exceeds a predetermined threshold, wherein at each iteration at least one of: different search-string is generated, different reference-text is obtained, different document is received.

28 Claims, 4 Drawing Sheets

(51) Int. Cl.
  *G06N 20/00* (2019.01)
  *G06F 16/332* (2019.01)
  *G06F 16/338* (2019.01)
  *G06F 18/214* (2023.01)
(52) U.S. Cl.
  CPC ........ *G06F 16/3341* (2019.01); *G06F 16/353* (2019.01); *G06F 18/214* (2023.01); *G06N 20/00* (2019.01)

(56) References Cited

U.S. PATENT DOCUMENTS

| | | | | |
|---|---|---|---|---|
| 8,819,021 | B1* | 8/2014 | Charnock | G06F 16/3331 707/738 |
| 9,355,088 | B2* | 5/2016 | Simard | G06F 40/242 |
| 9,678,949 | B2* | 6/2017 | Monk, II | G06F 40/30 |
| 9,875,258 | B1* | 1/2018 | Hsiao | G06F 16/532 |
| 10,546,001 | B1* | 1/2020 | Nguyen | G06F 40/186 |
| 10,789,305 | B2* | 9/2020 | Skrenta | G06F 16/248 |
| 11,216,725 | B2* | 1/2022 | Bouton | G06F 16/951 |
| 11,314,837 | B2* | 4/2022 | Aviyam | G06F 16/24578 |
| 11,392,651 | B1* | 7/2022 | McClusky | G06F 40/295 |
| 2007/0150472 | A1* | 6/2007 | Cao | G06F 16/334 |
| 2007/0288453 | A1* | 12/2007 | Podilchuk | G06F 16/5854 707/999.005 |
| 2009/0006382 | A1* | 1/2009 | Tunkelang | G06F 16/3331 707/999.005 |
| 2009/0012956 | A1* | 1/2009 | Wen | G06F 16/338 707/999.005 |
| 2010/0217768 | A1* | 8/2010 | Yu | G16H 70/00 707/E17.069 |
| 2011/0093449 | A1* | 4/2011 | Belenzon | G06N 7/01 707/E17.108 |
| 2011/0153653 | A1* | 6/2011 | King | G06F 16/5846 707/769 |
| 2011/0161309 | A1* | 6/2011 | Lung | G06F 16/24578 707/706 |
| 2012/0203767 | A1* | 8/2012 | Williams | G06F 16/3323 707/769 |
| 2014/0201126 | A1* | 7/2014 | Zadeh | A61B 5/165 706/52 |
| 2015/0019463 | A1* | 1/2015 | Simard | G06F 3/0482 706/12 |
| 2015/0193436 | A1* | 7/2015 | Slaney | G06F 16/334 707/728 |
| 2016/0253679 | A1* | 9/2016 | Venkatraman | G06Q 30/0185 705/310 |
| 2016/0364454 | A1* | 12/2016 | Yang | G06F 16/24575 |
| 2017/0075877 | A1* | 3/2017 | Lepeltier | G06F 40/117 |
| 2017/0235848 | A1* | 8/2017 | Van Dusen | G06F 16/904 705/12 |
| 2017/0310546 | A1* | 10/2017 | Nair | H04L 41/0654 |
| 2018/0101600 | A1* | 4/2018 | Ushanov | G06F 16/24578 |
| 2018/0204111 | A1* | 7/2018 | Zadeh | G06V 10/764 |
| 2018/0232443 | A1* | 8/2018 | Delgo | G06F 16/35 |
| 2018/0232453 | A1* | 8/2018 | Melman | G06F 16/248 |
| 2018/0285738 | A1* | 10/2018 | Bouton | G06F 16/24568 |
| 2019/0108228 | A1* | 4/2019 | Zeng | G06F 16/24522 |
| 2019/0108282 | A1* | 4/2019 | Zeng | G06F 16/243 |
| 2019/0164193 | A1* | 5/2019 | Drake | G06Q 30/0271 |
| 2019/0205470 | A1* | 7/2019 | Ronen | G06F 16/285 |
| 2019/0272071 | A1* | 9/2019 | Greenberger | G06F 3/0484 |
| 2020/0104401 | A1* | 4/2020 | Burnett | G06F 16/289 |
| 2020/0104402 | A1* | 4/2020 | Burnett | G06F 16/2477 |
| 2020/0133964 | A1* | 4/2020 | Lee | G06F 16/355 |
| 2020/0202171 | A1* | 6/2020 | Hughes | G06F 18/214 |
| 2021/0125191 | A1* | 4/2021 | Wang | G06F 16/24578 |
| 2021/0382924 | A1* | 12/2021 | Aaltonen | G06F 16/3329 |

OTHER PUBLICATIONS

The Patent Office, Intellectual Property India, Examination Report under sections 12 & 13 of the Patents Act, 1970 and the Patents Rules, 2003, Application No. 201811038053, dated Dec. 26, 2022, 6 pages.

International Search Report, Application No. PCT/IB2019/058552, dated Feb. 12, 2020, 2 pages.

* cited by examiner

METHOD AND SYSTEM TO PERFORM TEXT-BASED SEARCH AMONG PLURALITY OF DOCUMENTS

TECHNICAL FIELD

The present disclosure relates generally to data processing; and more specifically, to methods for training systems to perform text-based search among a plurality of documents. Moreover, the present disclosure also relates to systems to perform text-based search among a plurality of documents. Furthermore, the present disclosure relates to a software product recorded on machine-readable non-transient data storage media, characterized in that the software product is executable upon computing hardware to implement the aforesaid methods for training systems to perform text-based search among a plurality of documents.

BACKGROUND

With the advancement in technology, published information has rapidly increased. As the volume of published information in electronic media grows, with it grows the challenges of managing and processing such overload of information.

Traditionally, a user, such as an inventor, a researcher or a person skilled in the art, used available data sources, such as internet, to search for information. Moreover, such data sources offer a huge amount of information to the user that is beyond the user's capability to handle. Furthermore, redundant information from such data sources creates even more difficulties to find relevant information. Additionally, manual searching of the available results (or hits) on the internet and reviewing the results one-by-one becomes a tedious and a time-consuming task for the user. Moreover, selection of an appropriate set of keywords to obtain relevant documents is furthermore challenging.

For example, if an inventor wants to file a patent application, it is important to utilize information, from prior art such as published patent applications and/or granted patents as well as non-patent literature (such as research papers, thesis, publications and the like), to predict the future of such idea. Presently, a careful preparation of a search string by the user is required for obtaining relevant search results (such as documents) on a search engine. For instance, if a search string is too broad, corresponding search results may include so many documents that the user may not be able to review even the most relevant documents due to the long list of search results. Alternatively, if a search string is too narrow, corresponding search results may exclude documents that may be important to the user. Furthermore, manual searching of the prior arts and going through the search results one-by-one by the user is tedious and time-consuming. Moreover, selection of an appropriate search string to obtain relevant documents is a challenging task. Additionally, the user is unable to predict a likelihood of novelty of his idea from the search results obtained from the search that the user conducted on the search engine. Conventional techniques for obtaining information, using keywords, aims towards organizing information in various systematic categories in order to be more usable and easier to search. For example, a healthcare database comprising all the patient records in the form of Electronic Health records (EHR) may be accessed by doctors remotely to identify patterns and select important information specific to a patient for diagnosis of the patient. However, such techniques fail at filtering information and providing accurate data required by the user. Furthermore, the conventional search systems fail to understand the context of users' query, thereby, resulting in redundant and non-relevant data. Referring to the above example, the conventional techniques provides all the available data related to the patient without understanding the context of search, that requires data related to only the thyroid profile of the patient.

Therefore, in light of the foregoing discussion, there exists a need to overcome the aforementioned drawbacks associated with the conventional methods for performing text-based search.

SUMMARY

The present disclosure seeks to provide a method for training a system to perform text-based search among a plurality of documents, wherein each document comprises text having at least one reference-identifier. The present disclosure also seeks to provide a system to perform text-based search among a plurality of documents, wherein each document comprises text having at least one reference-identifier. The present disclosure seeks to provide a solution to the existing problem of contextually irrelevant, time-consuming, and inefficient searching techniques. The present disclosure also seeks to provide a solution to the existing problem associated with manual searching of prior arts to estimate probability of novelty of a document (such as, to get a grant of a patent). An aim of the present disclosure is to provide a solution that overcomes at least partially the problems encountered in prior art, and provide a seamless, faster and optimized method of performing text-based search among plurality of documents with a notion of receiving contextual relevant data thereby.

In one aspect, an embodiment of the present disclosure provides a method for training a system to perform text-based search among a plurality of documents, wherein each document comprises text having at least one reference-identifier, the method comprising:
(a) receiving a starting document, having at least one reference-identifier associated with the starting document;
(b) selecting a reference-text from the starting document;
(c) generating a search-string by using
 a plurality of keywords selected from the reference-text using at least one first machine learning algorithm, and
 at least one search-operator derived for the plurality of keywords using at least one second machine learning algorithm;
(d) performing a search among the plurality of documents using the search string to fetch a set of documents;
(e) determining a number of relevant documents in each of the set of documents;
(f) deriving a reference-identifier distribution, corresponding to the at least one reference-identifier associated with the document, for the number of relevant documents; and
(g) corelating the at least one reference-identifier associated with the starting document with the reference-identifier distribution to determine a performance-score for the system,
wherein at least the steps (c) to (g) are performed iteratively until the performance-score exceeds a predetermined threshold, wherein at each iteration a different search-string is generated at the step (c).

In another aspect, an embodiment of the present disclosure provides a system to perform text-based search among a plurality of documents, wherein each document comprises text having at least one reference-identifier, the system comprising:
  a database having the plurality of documents; and
  a server arrangement operable to
    (i) receive a starting document having at least one reference-identifier associated with the document,
    (ii) select a reference-text from the starting document,
    (iii) generate a search-string by using
      a plurality of keywords selected from the reference-text using at least one first machine learning algorithm, and
      at least one search-operator derived for the plurality of keywords using at least one second machine learning algorithm,
    (iv) perform a search among the plurality of documents using the search string to fetch a set of documents,
    (v) determine a number of relevant documents in each of the set of documents;
    (vi) derive a reference-identifier distribution, corresponding to the at least one reference-identifier associated with the document, for the number of relevant documents, and
    (vii) corelate the at least one reference-identifier associated with the starting document with the reference-identifier distribution to determine a performance-score for the system,
  wherein at least the steps (iii) to (vii) are performed iteratively until the performance-score exceeds a predetermined threshold, wherein at each iteration a different search-string is generated at the step (iii).

In yet another aspect, an embodiment of the present disclosure provides a software product recorded on machine-readable non-transient data storage media, wherein the software product is executable upon computing hardware to implement the aforesaid method for training a system to perform text-based search among a plurality of documents, wherein each document comprises text having at least one reference-identifier.

Embodiments of the present disclosure substantially eliminate or at least partially address the aforementioned problems in the prior art, and provides an efficient and reliable method and system for retrieving contextually relevant data and also enable convenient and reliable estimation of the probability of novelty of the document.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for training a system to perform text-based search among a plurality of documents, wherein each document comprises text having at least one reference-identifier, the method comprising:
  (a) receiving a starting document, having at least one reference-identifier associated with the document;
  (b) selecting a reference-text from the starting document;
  (c) generating a search-string by using a plurality of keywords selected from the reference-text using at least one first machine learning algorithm, and at least one search-operator derived for the plurality of keywords using at least one second machine learning algorithm;
  (d) performing a search among the plurality of documents using the search string to fetch a set of documents;
  (e) determining a number of relevant documents in each of the set of documents;
  (f) deriving a reference-identifier distribution, corresponding to the at least one reference-identifier associated with the document, for the number of relevant documents; and
  (g) corelating the at least one reference-identifier associated with the starting document with the reference-identifier distribution to determine a performance-score for the system,
  wherein at least the steps (c) to (g) are performed iteratively until the performance-score exceeds a predetermined threshold, wherein at each iteration a different search-string is generated at the step (c).

In another aspect, an embodiment of the present disclosure provides a system to perform text-based search among a plurality of documents, wherein each document comprises text having at least one reference-identifier, the system comprising:

a database having the plurality of documents; and
a server arrangement operable to
- (i) receive a starting document, having at least one reference-identifier associated with the document,
- (ii) select a reference-text from the starting document,
- (iii) generate a search-string by using
    - a plurality of keywords selected from the reference-text using at least one first machine learning algorithm, and
    - at least one search-operator derived for the plurality of keywords using at least one second machine learning algorithm,
- (iv) perform a search among the plurality of documents using the search-string to fetch a set of documents,
- (v) determine a number of relevant documents in each of the set of documents;
- (vi) derive a reference-identifier distribution, corresponding to the at least one reference-identifier associated with the document, for the number of relevant documents, and
- (vii) corelate the at least one reference-identifier associated with the starting document with the reference-identifier distribution to determine a performance-score for the system, wherein at least the steps (iii) to (vii) are performed iteratively until the performance-score exceeds a predetermined threshold, wherein at each iteration a different search-string is generated at the step (iii).

The present disclosure seeks to provide a method and system for performing text-based search among a plurality of documents and enables efficient and reliable extraction (or retrieval) of relevant documents, from a plurality of documents, having at least one reference-identifier associated with the document. Beneficially, the present disclosure provides a user with an efficient method involving reduced data processing and time complexity. Additionally, a trained system automatically provides relevant documents corresponding to a search-string, thereby enabling a significant reduction in the amount of input by the user. Moreover, an automated system reduces loss of context of the search-string as every segment of the search-string is contextually analysed, based on a set of appropriate keywords and Boolean search-operators for the keywords, during the process of extracting (or retrieving) the relevant documents. Consequently, the method performs extraction of relevant documents with an understanding regarding the ontology and context of the search-string. Additionally, the system is indispensable for rapid extraction and handling of relevant documents. Beneficially, the method and system of the present disclosure function as essential tools in efficient and effective searching, referencing, preparation and examination of one or more patent applications in the given field of technology, by incorporating a high degree of intellectual input. The system also provides the user with the estimation of probability of novelty of the starting document by searching a plurality of prior arts available in the database. Thus, enabling a time efficient and a relevant search for the user, and providing an estimation of probability of novelty to the user. Thus, the method and the system enable to reduce laboriousness and/or boredom experienced by the user while manually searching the prior arts. Furthermore, the system also provides with a minimum number of plurality of words related to the document that when used for an application, increases a probability of novelty of the application. Moreover, the user can reliably use the minimum number of plurality of words in the application related to the document, thereby, improving a likelihood of the user of getting a favorable outcome, such as novelty and a broad legal scope.

Throughout the present disclosure, the term "text-based search" as used herein refers to searching (namely, finding, accessing and so forth) for text-based information. Additionally, the text-based search may be based on an inferred meaning of one or more words of the search-string. It will be appreciated that the one or more words may have multiple meanings and semantic relations thereof, abbreviations, linguistic variations and so forth associated with them. Specifically, the text-based search may take into account such association with the one or more words to provide results, such as documents, that match the search-string, to the user. In other words, text-based search aims at accessing information based on contextual meaning of the search-string. The "user" relates to any entity including one or more persons, computers or other devices, or combinations thereof, using the method and/or system described herein.

Throughout the present disclosure, the term "document" as used herein, refers to a text-based material that is provided to a search engine, a web user, a competent authority (such as Patent Office in operation under different jurisdictions), and so forth. Moreover, the document may be a single file or a plurality of files (referred to as "plurality of documents" hereafter). Furthermore, documents may be prepared and stored as files in one or more suitable file formats including, but not limited to, HTML, XML, PDF and MS Word (DOC or DOCX). The document may include a patent, an application for a patent, a patent specification (such as a provisional, a complete or a purported specification), a trademark patent, a Patent Bibliographic Data (such as Patent Bibliographic Raw Data supplied by the U.S. Patent and Trademark Office, and so forth), publications by different Patent Offices, abstracts, registered utility models, or any other published text. Furthermore, the method and system for performing text-based search among the plurality of documents comprises extracting the documents from a repository of plurality of documents. Moreover, the documents are retrieved by processing (namely, refining) the plurality of documents.

The term "starting document" may refer to an information for which the user wants to conduct the search. It may include innovation related information to a product, a process or an apparatus in a documented form. Alternatively, optionally, the starting document may be a subject of thought as to a possible course of action related to the product, the process or the apparatus in a non-documented form. Furthermore, the product, the process or the apparatus can be related to a scientific-technological domain, a socio-political domain and the like. A starting document that meets a set of relevant legal conditions such as novelty, an at least one inventive-step, an industrial applicability and so forth, qualifies as a novel invention. The starting document may be received from a user, wherein the user relates to any entity including a person (i.e., human being) or a virtual personal assistant (an autonomous program or a bot) using the method and/or the system described herein.

Furthermore, the system comprises a database. Moreover, the database is operable to store a plurality of documents, whether related or not related to the text-based search. Moreover, a communication module is operably to retrieve existing data sources from the database arrangement. Additionally, the communication module is operatively coupled to a server arrangement.

Throughout the present disclosure, the term "database" as used herein, refers to an organized body of digital information regardless of the manner in which the data or the organized body thereof is represented. Optionally, the database may be hardware, software, firmware and/or any combination thereof. For example, the organized body of digital information may be in the form of a table, a map, a grid, a packet, a datagram, a file, a document, a list or in any other form. The database includes any data storage software and systems, such as, for example, a relational database like IBM DB2 and Oracle 9.

Typically, the database comprises (namely, stores) the plurality of documents. The plurality of documents comprises classified documents and/or unclassified documents, wherein the classified documents are arranged in different classes, namely categories such as the reference-identifiers. Optionally, the database provides relevant classified documents dynamically in response to the search-string, including for example a text-based search-string, an image-based search-string, an audio-based search-string, a video-based search-string, a biometric-based search-string, or any combination thereof. In an example, a database may comprise information related to patents, specifications, application for a patent and so forth. Furthermore, the database may contain different spellings, morphological forms, singular and plural forms, synonyms, derivational and functional form of one or more words of the search-string.

Furthermore, optionally, the database may include translation into English-language of any non-English-language (namely, a foreign language, such as Fresh, Japanese, German, Chinese and so forth) document. In an example, the database may comprise an English-language document and a French-language document, that are aligned and have one-to-one correspondence between the English and French-language documents, wherein the French-language document is a translation of the English-language document.

The method comprises receiving the starting document. The starting document may be received from a plurality of documents made available from public or available internal sources or from a user. For example, the various sources for documents include internet, social networking websites, blogs, news, institutes, journals, government agencies, such as Patent Offices, and so forth. Specifically, the starting document is received or retrieved from the database, comprising a plurality of documents. More specifically, the database stores plurality of documents which comprises classified documents and/or unclassified documents. Moreover, each document comprises text having at least one reference-identifier associated with the document.

Throughout the present disclosure, the term "reference-identifier" as used herein refers to at least one category classifying the document according to such at least one category. Typically, the reference identifiers may be taken as classification codes and schemes, approved by a competent authority, for classifying one or more portions of a document. The reference-identifier include, but do not limit to, a classification code, a patent number, an application number and a publication number. In an example, 'IPC' and 'CPC' are hierarchical classification systems used primarily to classify and search patent-related documents (namely, application for patent, patent, specifications, utility models and so forth) according to the technical fields (namely, state of the art in given fields of technology) they pertain. Optionally, each of the plurality of documents further comprises a plurality of sections having the text distributed there-along, wherein the plurality of sections comprises at least one reference-section and at least one search-section. Specifically, the documents have text that is categorized and/or tagged under various categories or tags, based on the context of the subject matter. For example, text of the document that discusses the general prior art, its features and limitations and brings out the need for an invention to overcome the drawbacks of the prior art is categorized under a section namely 'Background'. Similarly, text of the document that specifies legal scope of protection for the invention is categorized under a section namely 'Claims'. Moreover, the plurality of documents comprise the plurality of sections including, but do not limited to, a title, a technical field, a background, a summary, advantages, an aim, definitions, a detailed description of embodiments, a description of drawings, a claim, and an abstract. Specifically, the plurality of sections enable distribution of the text of the patent document, in particular a specification, into respective attributes relating to the context of the subject-matter.

Furthermore, the plurality of sections of the document may further be categorized as at least one reference-section and at least one search-section. The reference-section includes at least one of a plurality of section of the document. Optionally, the at least one reference-section includes 'Claims', 'Abstract' and 'Technical Field'. Moreover, the search-section includes at least one of a plurality of section within the document or in a different document from a plurality of documents. Optionally, the at least one search-section includes, but does not limit to, the 'Description of Embodiments', 'Summary', 'Claims' and 'Abstract'.

The method comprises selecting a reference-text from the document. The term "reference-text" as used herein, refers to text (in part (namely, portion) or whole) obtained from the document. Typically, the reference-text provides a list of words that likely convey a gist of the document. Specifically, the reference-text is selected from the at least one of the plurality of sections of the document. Optionally, the reference-text is a portion of the at least one of the plurality of sections of the document. More optionally, the portion is a phrase, one or more sentences, a paragraph or a plurality of words therefrom selected from at least one of the plurality of sections of the document. Alternatively, the reference-text is entire text of at least one of the plurality of sections of the document. In an example, the reference-text may be a portion of the 'Claims' section of the document. In another example, the reference-text may be the entire 'Abstract' and/or 'Technical Field' section of the document.

Moreover, the server arrangement is operable to receive the starting document. The starting document has at least one reference-identifier associated with the document. Throughout the present disclosure, the term "server arrangement" as used herein, refers to a structure and/or module that includes programmable and/or non-programmable components configured to receive the search-string, and store, process and/or share the results of the text-based search. In an example, the server arrangement may include components such as a memory unit, a processor, a network adapter and the like, to receive, store, process and/or share the results. The server arrangement can include a single server or multiple servers communicably coupled with each other. Furthermore, the server arrangement can be a server system in a cloud or a dedicated server system. Furthermore, the server arrangement is communicably coupled with a database through a communication network. Optionally, the communication network is a wired network, a wireless network, or any combination thereof. Examples of the communication network include, but are not limited to, Local Area Networks (LANs), Wide Area Networks (WANs), Metropolitan Area Networks (MANs), Wireless LANs (WLANs), Wireless WANs (WWANs), Wireless MANs (WMANs), radio network, the Internet, second generation (2G) telecommunication networks, third generation (3G) telecommunication networks, fourth generation (4G) telecommunication networks, fifth generation (5G) telecommunication networks, Worldwide Interoperability for Microwave Access (WiMAX) networks and suchlike. In an embodiment, the communication network between the server arrangement and the database occurs over short-range networks and/or long-range networks. Specifically, the communication module is configured to transmit the results, such as documents, relevant to the search, stored in the database, to the server arrangement, wherein the server arrangement is communicably coupled to the database. In an embodiment, the server arrangement can be used to provide for example a web interface to access information, such as a plurality of documents and relevant documents, related to the search. Beneficially, the server arrangement allows for example centralized monitoring of all related data, such as relevant documents, from different locations. In an embodiment, the server arrangement communicates documents from the database to search engines and web users in response to a search-string. Moreover, such communication may be performed according to, for example, the HTTP protocol, File Transfer Protocol (FTP), Simple Mail Transport Protocol (SMTP) and Network News Transfer Protocol (NNTP).

Optionally, the reference-text is selected from at least one reference-section of the plurality of sections of the starting document. In an example, the reference-text is selected from the first independent claim of the 'Claims' section. Optionally, the sections 'Claims' and 'Abstract' comprise substantially similar reference-text. Moreover, the section 'Technical Field' specifies the state of the art of the field of technology the invention pertains to, and may have reference-text substantially different from that of the sections 'Claims' and 'Abstract'. For example, by "substantially similar" is meant identical to within 80-99% of common text between the sections 'Claims' and 'Abstract', more optionally to within 90-95% of common text between the sections 'Claims' and 'Abstract'. For example, by "substantially different" is meant less than 60-70% of common text between the section 'Technical Field' and the sections 'Claims' and 'Abstract', more optionally less than 60-65% of common text between the section 'Technical Field' and the sections 'Claims' and 'Abstract'.

Optionally, the server arrangement is operable to select the reference-text from at least one reference-section of the plurality of sections of the starting document. Notably, the reference-text is selected automatically.

The method comprises generating a search-string by using a plurality of keywords selected from the reference-text using at least one first machine learning algorithm, and at least one search-operator derived for the plurality of keywords using at least one second machine learning algorithm. Throughout the present disclosure, the term "search-string" as used herein refers to the search-string comprising one or more words which are descriptive of elements that the user desires to locate. Specifically, the search-string includes, but is not limited to, an alpha-numeric text, an icon, a photo, an audio and/or a video clip. More specifically, the search-string comprises a plurality of keywords and/or one or more search-operators therebetween.

The term "keyword" as used herein refers to one or more words present within the plurality of documents, that characterize and summarize the context of the corresponding plurality of documents. Notably, the keywords are generated automatically. Specifically, the keywords relate to the one or more words that occur frequently in the document. More specifically, the generation of keywords excludes stop words, such as for example "and", "if", "the", "have", "is", and so forth. In example, the search-string "automobile engine" may be used to locate patents related to various types of engines employed in automobiles. In such an example, the search engine reads the search-string "automobile engine", comprising the keywords "automobile" and "engine", and retrieve elements that match one or more keywords in the search-string. The elements may include products, services, documents, sellable units, user profiles, customer-created content (such as artwork, music, book and the like), or anything else to which a search may be targeted to access information.

The term "machine learning algorithm" refers to a process or a set of rules that that provides the system an ability to automatically learn and improve from experience without being explicitly programmed. Furthermore, the term "first machine learning algorithm" as used herein, refers to a machine learning algorithm employed by the system for selecting a plurality of keywords from the reference-text. Typically, the first machine learning algorithm is stored in a memory, such as RAM, SRAM, DRAM, ROM, PROM and so forth, of the database. Generally, the instructions include instructions for identifying specific terms, namely keywords, and the frequency of occurrence for each of the plurality of keywords in the reference-text. It will be appreciated that the frequency of occurrence for each of the plurality of keywords in the reference-text is identified by referencing an index stored in the memory, wherein the index includes data indicating a frequency of occurrence for each of multiple terms in the reference-text. Consequently, the reference-text may be stored in the memory. Optionally, the index is prepared by at least one of: the database, an external system, an external third party. In an embodiment, the set of keywords are extracted from the document using a calculative analysis. The calculative analysis is performed to assign a score to the words of the document, wherein the keywords of the document are assigned a higher score than other words of the document. Subsequently, the set of keywords are obtained from the document.

In an example, a starting document from the user contains 'The present disclosure relates to mobility aid devices. More specifically, the present disclosure relates to motorized wheelchairs using artificial intelligence. Furthermore, the present disclosure relates to methods of manufacturing mobility aid devices.' A set of keywords after performing a calculative analysis and scoring of the words may be mobility, aid, motorized, wheelchairs, artificial intelligence and so forth. In another example, the set of keywords can be input by the user itself as mobility, aid, motorized, wheelchairs and artificial intelligence.

The term "search-operator" as used herein refers to a special set of predefined words/operators defined to perform a specific task. The search-operators are used to narrow down the scope of search. Specifically, the one or more search-operators include Boolean search-operators, proximity search-operators, exact search-operators, and truncation and wildcard search-operators. More specifically, the one or more search-operators include, but do not limit to, 'AND', 'OR', 'NOT', 'NAND', 'NOR', 'NEAR', 'FBY' (used for specifying "followed by"), '*' (used for specifying "final word in the phrase"), '?' (used for specifying "replacement of any character"), and 'EXACT' "X and Y" (wherein, 'X' and 'Y' are keywords or phrases for which records, exactly matching the keywords, are retrieved).

The term "second machine learning algorithm" as used herein, refers to a machine learning algorithm employed by the system for deriving at least one search-operator for the plurality of keywords. Typically, the second machine learning algorithm is also stored in the memory of the database. Generally, the instructions include instructions for deriving suitable search-operator for a pair of keywords. Furthermore, the search-operator may be a Boolean logic, proximity search-operator, exact search-operator, and truncation and wildcard search-operator. It will be appreciated that the at least one search-operator is derived based on the context of the search-string and the keywords therein. Consequently, the at least one search-operator is used between a pair of keywords to make the search-string more contextually-relevant. Optionally, the at least one search-operator is derived from at least one of: the database, an external system, an external third party.

Furthermore, the search-operators logically combine a plurality of keywords using at least one or more search-operators. It will be appreciated that for the logical combination of the plurality of keywords, at least two keywords and one search-operators is required. In an example, a plurality of keywords comprise 3 keywords i.e. 'wheel', 'engine' and 'automobile'. For the generation of the search-string comprising the plurality of keywords 'engine' and 'automobile', an "AND" Boolean search-operator is used, such as 'engine AND automobile'. Optionally, for a search-string comprising 'engine', 'automobile' and a synonym of the word 'automobile', such as for example a 'car', an "OR" Boolean search-operator and an "AND" Boolean search-operator is used, such as 'engine AND automobile OR car'. Moreover, proximity search-operators may be used between at least two keywords for the generation of a search-string, wherein the proximity search-operator is used to identify keywords in proximity with each other, and wherein a degree of proximity for the search-string may vary. In an example, for the generation of a search-string using the keywords 'engine' and 'automobile' in proximity with each other, proximity search-operator is used. Notably, the degree of proximity of the keywords 'engine' and 'automobile' is defined by a number of words between the keywords 'engine' and 'automobile'. Additionally, exact search-operator and truncation and wildcard search-operator may be used.

Moreover, additional machine learning algorithms, namely, logics of the text, may be stored in the memory. Optionally, the additional machine learning algorithm enable executing a search-string, including a plurality of keywords and search-operators for the plurality of keywords, to identify the relevant documents, and creating a refined search-string comprising at least two keywords and a suitable search-operator from the plurality of keywords and the set of search-operators respectively.

Moreover, the server arrangement is operable generate a search-string by using a plurality of keywords selected from the reference-text using at least one first machine learning algorithm, and at least one search-operator derived for the plurality of keywords using at least one second machine learning algorithm.

Optionally, the different search-string is generated by at least one of: selecting at least one different keyword from the plurality of keywords by the first machine learning algorithm or altering the at least one search-operator by the second machine learning algorithm. It will be appreciated that a careful preparation of the search-string may improve the retrieval of most relevant documents to the user, first. Typically, however, constructing a best possible search-string is important yet difficult. For example, if a search-string is too broad, corresponding search results may include so many documents that the user may not review even the most relevant documents due to the long list of search results. Alternatively, if a search-string is too narrow, corresponding search results may exclude documents that may be important to the user. Accordingly, it is desirable to construct a different search-string, comprising a plurality of keywords that occur frequently in the document and one or more search-operators for the plurality of keywords, until the most relevant documents corresponding to the search-string are retrieved. Optionally, generating a different search-string is achieved by either selecting at least one different keyword using a first machine learning algorithm, altering at least one search-operator for the keywords using the second machine learning algorithm, or a combination thereof. For example, in the above example, the keywords 'wheel', 'engine' and 'automobile' may be changed as 'internal combustion', 'external combustion' and 'biofuel'. For the generation of the different search-string comprising the plurality of keywords 'internal combustion' and 'external combustion', an "OR" Boolean search-operator is used, such as 'internal combustion OR external combustion'. Optionally, for a search-string comprising 'internal combustion', 'external combustion' and 'biofuel', an "OR" Boolean search-operator and an "AND" Boolean search-operator is used, such as 'internal combustion OR external combustion AND biofuel'.

Moreover, the server arrangement employs the first and second machine learning algorithms to select at least one keyword from the plurality of keywords and alter the at least one search-operator respectively. In this regard, the server arrangement is configured to determine the other most frequently occurring keywords in the document and using the same in the new search-string. Furthermore, the system employs second machine learning algorithm to identify the appropriate search-operator to make the search-string contextually relevant.

The method comprises performing a search among the plurality of documents using the search-string to fetch a set of documents and determining a number of relevant documents in each of the set of documents. The term "relevant document" as used herein refers to any document that contains all or part of a search-string or terms related to the search-string. Typically, the relevant document includes, but is not limited to, a granted patent, an application for a patent, a patent specification (such as a provisional, a complete or a purported specification), a trademark patent, a Patent Bibliographic Data (such as Patent Bibliographic Raw Data supplied by the U.S. Patent and Trademark Office, and so forth), publications by different Patent Offices, abstracts, registered utility models, or any other published text. Moreover, the relevant document includes substantially similar subject-matter in the at least one reference-identifier associated with the document and the reference-identifier of the search-string. For example, a document 'A' obtained from a document repository may be relevant to a document 'B' in consideration, if the document 'A' includes a plurality of keywords, including a synonym of the at least one keyword or an alternative spelling of at least one keyword, similar to the keywords selected from the document 'B' when searched in, for example, the Abstract of the document 'A'. Furthermore, the search-string is generated by using a plurality of keywords and one or more search-operators. Moreover, the server arrangement is operable to perform a search among the plurality of documents using the search-string to fetch a set of documents. Furthermore, the server arrangement is configured to identify and retrieve the set of relevant documents from the plurality of documents that match with the search-string. Optionally, the search-string may be operable to store the search results, by means of an index or log, in the database.

In an embodiment, the set of documents are identified based on search strings using at least one of: Boolean operators, proximity operators, exact operator and truncation and wildcard operator. In an example, for identifying a set of set of documents comprising all the keywords of the plurality of search strings, an AND operator is used between all the keywords of the plurality of search strings. In another example, for identifying the set of documents comprising only one of the keyword of the plurality of search strings is required, an OR operator is used between the keywords.

Optionally, the search is performed in at least one search-section of the plurality of sections among the plurality of documents. In an example, the at least one search-section may be made available in the same document as that of the reference-section or within one or more different documents. Moreover, the server arrangement is operable to perform search in at least one search-section of the plurality of sections among the plurality of documents. Optionally, performing the search comprises selecting a different search-section of the plurality of sections among the plurality of documents to fetch the set of relevant documents. It will be appreciated that when the search-section and the reference-section are within the same document or in the different documents, the probability of achieving a biased result increases. For example, if the reference-text is obtained from the 'Claims' section of a document 'A', and the search, using a plurality of keywords along with one or more search-operator, is also performed in the 'Claims' section of the same document 'A', then the probability of finding all of the plurality of keywords used in the search-string is highest for the document 'A'.

The method comprises deriving a reference-identifier distribution, corresponding to the at least one reference-identifier associated with the document, for the number of relevant documents. The term "reference-identifier distribution" as used herein refers to a function or listing showing all the possible variants of a set of similar data, such as the reference-identifier, associated with a group, such as a field of technology, and a frequency of their occurrence. Optionally, the distribution is based on a continuous numerical data, a percentage, a ratio, and so forth. Moreover, the frequency of occurrence of the variants is a numerical or a normalized value of the numerical. Each relevant document as well as the document (or starting-document) is correlated with the reference-identifier distribution to identify the relevance of the document based on the rank it holds in the reference-identifier distribution.

The method comprises corelating the at least one reference-identifier associated with the document with the reference-identifier distribution to determine a performance-score for the system. The term "performance-score" as used herein refers to the effectiveness of the overall training of the system. Optionally, performance-score of the system is based on the search-string, document, and the retrieval of relevant documents upon use of given keywords and search-operators therefor in the search-string. Specifically, the performance score is related with the effectiveness of the search-string in training the system to provide the most relevant documents to the user first. Beneficially, a high degree of correlation between the reference-identifier associated with the document and the reference-identifier distribution may be associated with the effectiveness of the overall training of the system. For example, if a given search-string provides 10 relevant documents out of 1000 documents, then the performance-score of the system is 0.1. Additionally, listing of the most relevant documents corresponding to the search-string provides the user to review the said documents with a high degree of attention, thereby eliminating any chance of missing out on a relevant document due to the long list of search results.

Optionally the performance-score is determined based on at least one of: a frequency of occurrence of the at least one reference-identifier associated with the document in the reference-identifier distribution or a position of the at least one reference-identifier associated with the document in the reference-identifier distribution. Typically, higher the frequency of occurrence of the at least one reference-identifier associated with the document in the reference-identifier distribution, higher is the performance score, and thereby higher the effectiveness of the system. Moreover, the position of the document, from which reference-text is obtained, in the retrieved list of relevant documents specifies the effectiveness of the system in automatically associating an invention to a particular class of inventions.

The term "predetermined threshold" as used herein refers to a minimum numerical value as a measure of effectiveness of the system. Typically, if the performance-score exceeds the predetermined threshold, it implies that the system is able to perform the text-based search correctly, whereas if the performance-score is less than or equal to the predetermined threshold the system is not effective enough to perform a text-based search effectively and efficiently, and may further need additional training, preferably with a different document, different keywords and search-operators therefor.

Optionally, the method comprises iteratively performing steps (iii) to (vii) until the performance-score exceeds a predetermined threshold, wherein at each iteration a different search-string is generated at the step (iii). In other words, the method iteratively: generates the search-string by using the plurality of keywords selected from the reference-text using at least one first machine learning algorithm and at least one search-operator derived for the plurality of keywords using at least one second machine learning algorithm; performs the search among the plurality of documents using the search-string to fetch a set of relevant documents; derives the reference-identifier distribution, corresponding to the at least one reference-identifier associated with the starting document, for the set of relevant documents; and corelates the at least one reference-identifier associated with the document with the reference-identifier distribution to determine the performance-score for the system, until the performance-score exceeds the predetermined threshold, wherein at each iteration a different search-string is generated using the plurality of keywords selected from the reference-text using at least one first machine learning algorithm and at least one search-operator derived for the plurality of keywords using at least one second machine learning algorithm. In other words, if the performance-score is less than or equal to predetermined threshold, a different search-string is generated and search based on the new search-string is performed and the performance score is calculated until the performance score exceeds the predetermined threshold.

Optionally, the method comprises iteratively performing the steps (b) to (g) until the performance-score exceeds the predetermined threshold, and wherein at each iteration, a different reference-text within the document is selected at the step (b). It will be appreciated that by only changing the search-string, as performed in step (c), from the same reference-text may not enhance performance score, as the given reference-text may not be truly representative of the content of the document. In such a case, a different text within the document is selected until the performance-score exceeds the predetermined threshold. Thus, when using a search-string generated using such reference-text, the performance-score of the system would be high and considered as a good search-string to train the system. In an example, the performance-score is calculated based on the 'Abstract' as reference-text. If the performance-score does not exceed the predetermined threshold, a different reference-text, such as 'Claims' is selected as the different reference-text and the steps (b) to (g) are iteratively performed until the performance-score exceeds the predetermined threshold.

Notably, such an iterative execution of steps allows for selecting different reference-texts from which a different search-string would be generated at each iteration. This would allow the system to identify the most relevant reference-text within the document, from which the most relevant search-string would be derived. The most relevant search-string would be one that allows the system to achieve the maximum possible performance-score for a given document.

Optionally, the method comprises iteratively performing the steps (a) to (g) until the performance-score exceeds the predetermined threshold, and wherein at each iteration, a different document is obtained at the step (a). It will be appreciated that by only changing the search-string, as performed in step (c), and/or the reference-text, as performed in step (b), from the same document may not enhance performance score, as the given document may not be a true representative of the reference-identifier distribution. In such a case, a different document from the plurality of documents is received until the performance-score exceeds the predetermined threshold. The different document selected is selected from the plurality of documents, wherein each document comprises text having at least one reference-identifier. It will be appreciated that the selected different document may be of a same technical field as that of the previous document or the selected different document may be of a different technical field. The different document is selected randomly from the plurality of documents. In an example, if the reference-identity associated with the document is not correlated with the reference-identifier distribution, it means that the document is not a good document to train the system.

Notably, such an iterative execution of steps allows for selecting different document from the plurality of documents would be received at each iteration. This would allow the system to identify the most relevant document, from which the most relevant reference-text and thereby the most relevant search-string would be derived. The most relevant search-string would be one that allows the system to achieve the maximum possible performance-score for a given document.

In an example, at a step (a), a document is selected randomly from the plurality of documents, wherein the document relates to electrical engineering. At a step (b), a reference-text selected from the document is a technical field of the document i.e. 'The present disclosure relates generally to wireless sensing networks, and more specifically, to a solar powered sensor node for a wireless sensing network'. At a step (c), a search-term generated using the first machine learning algorithm and the second machine learning algorithm is 'wireless AND sensing AND solar'. Furthermore, the steps (d) to (g) are performed. Moreover, the performance-score is determined. Suppose, the performance-score is less than or equal to the predetermined threshold, then at the step (c), a different search-term is generated using the first machine learning algorithm and the second machine learning algorithm such as 'wireless AND sensing AND sensing'. Furthermore, the steps (d) to (g) are performed. Moreover, the performance-score is determined. The steps (c) to (f) are iteratively performed until the performance-score exceeds the predetermined threshold. Suppose, the performance-score exceeds the predetermined threshold after the step (c), a different reference-text is selected at the step (b). The reference-text selected is such as an abstract of the document. Furthermore, a search-term generated from the abstract using the first machine learning algorithm and the second machine learning algorithm at the step (c). The performance-score is determined and the steps (c) to (g) are performed iteratively accordingly. It will be appreciated that the steps (b) to (g) are performed iteratively until the performance-score exceeds the predetermined threshold. Suppose, the performance-score exceeds the predetermined threshold after the step (b), a different document is selected randomly from the plurality of documents. Moreover, the steps (b) to (g) are performed iteratively accordingly.

Moreover, the server arrangement is operable to iteratively perform at least steps (iii) to (vii) until the performance-score exceeds a predetermined threshold, wherein at each iteration a different search-string is generated at the step (iii). In other words, server arrangement is operable to: generate the search-string by using the plurality of keywords selected from the reference-text using at least one first machine learning algorithm and at least one search-operator derived for the plurality of keywords using at least one second machine learning algorithm; perform the search among the plurality of documents using the search-string to fetch a set of relevant documents; derive the reference-identifier distribution, corresponding to the at least one reference-identifier associated with the document, for the set of relevant documents; and corelate the at least one reference-identifier associated with the document with the reference-identifier distribution to determine the performance-score for the system, until the performance-score exceeds the predetermined threshold, wherein at each iteration a different search-string is generated using the plurality of keywords selected from the reference-text using at least one first machine learning algorithm and at least one search-operator derived for the plurality of keywords using at least one second machine learning algorithm.

Optionally, the method further comprises implementing at least one action, based upon the performance-score of the system. Beneficially, the trained system is operable to implement different uses of the trained system. More optionally, the at least one action comprises at least one of: allocating a service provider to provide a specialized service pertaining to a given document, determining at least one reference-identifier associated with a given document, determining a set of relevant keywords for a given document. In a first use case, when allocating the service provider to provide specialized service pertaining to the given document, the method enables identification of an expert, such as a researcher, a scientist, an inventor, an applicant, a licensee, a workzone, and so forth, interested in same field of technology as that of the field of technology of the document. In such case, the document may be received from the user directly. The document may be in a form of an 'Abstract', a 'Summary', 'Claims' and so forth related to the subject-matter. It will be appreciated that the search-string, comprising keywords selected from the reference-text, is provided by the user to the search engine, the web or any information retrieval system. In such a case, the search-string is displayed to the user using the user interface of the search engine or the web. For example, the search-string may be provided using a mouse, a keyboard, a touchscreen and so forth.

In a second use case, when determining at least one reference-identifier associated with a given document, the method may use the listing based on the reference-identifier distribution. In such a case, the reference-identifier with the highest frequency of occurrence in the reference-identifier distribution may be associated with the reference-identifier of the given document.

In a third use case, when determining a set of relevant keywords for a given document, the method enables comparing two or more reference-identifier distributions corresponding to two or more set of keywords. It will be appreciated that a generating a best possible search-string is important yet difficult. For example, if a search-string is too broad, corresponding search results may include so many documents that the user may not review even the most relevant documents due to the long list of search results. Alternatively, if a search-string is too narrow, corresponding search results may exclude documents that may be important to the user. Accordingly, it is desirable to generate a search-string, comprising frequently-occurring keywords, selected from a reference-text. Consequently, the reference-identifier distribution with an askew distribution, based on the frequency of occurrence of relevant documents corresponding to a set of keywords, is chosen over an even distribution.

Moreover, the system may be used by a user for searching prior-arts related to an idea relating to a particular state of the art in a given field of technology. The system provides the user a number of prior arts related to the idea of the user. Furthermore, the user can estimate a probability of novelty of his idea based on the information provided by the user. Thus, the system enables a reduction in manual intervention and/or hassle experienced in manually searching for and reviewing a number of prior arts, which may or may not be relevant.

Optionally, the method comprises estimating probability of novelty of the starting document. The method includes the step of—determining a probability threshold, wherein the probability threshold is a measure of the probability of novelty of the starting document.

The term "probability threshold" used herein refers to a minimum numerical value that determines the probability of novelty of the starting document. Optionally, the probability threshold is determined by employing machine learning algorithms. The machine learning algorithms are employed by artificial intelligence techniques. The machine learning algorithms are programmed algorithms that receive and analyze an input data to predict output values within an acceptable range. Moreover, a new data determined by the machine learning algorithm is fed back to the machine learning algorithms, wherein the machine learning algorithms learn and optimize operations to improve performance, thereby, developing intelligence over time. The machine learning algorithms are used to determine a value of the probability threshold. The probability threshold is a value corresponding to the number of documents of the set of documents. In an example, the probability threshold determined is 5. Therefore, the plurality of search strings having the set of documents more than 5 will lie above the probability threshold, whereas the plurality of search strings having the set of documents less than 5 will lie below the probability threshold. In an embodiment, the probability threshold may be a mathematically normalized value. In an example, the probability threshold determined is 0.4. Therefore, the plurality of search strings having the mathematically normalized value more than 0.4 will lie above the probability threshold, whereas the plurality of search strings having the mathematically normalized value less than 0.4 will lie below the probability threshold.

Furthermore, the method estimating probability of novelty of the starting document comprises estimating the probability of the novelty of the document based on each of the plurality of search strings, wherein the novelty of the starting document based on a given search string is estimated as high, when the number of relevant documents in the set of documents corresponding to the given search string is less than or equal to the probability threshold. The probability of novelty of the subject-matter is estimated, wherein the probability of novelty of the starting document is estimated as high when the number of relevant documents corresponding to the given search string is less than or equal to the probability threshold. In an embodiment, the probability of novelty of the starting document is estimated, wherein the probability of novelty of the starting document is estimated as high when the mathematically normalized value assigned to the given search string is less than or equal to the probability threshold.

Alternatively, estimating the probability of the novelty of the starting document, wherein the novelty of the subject-matter based on a given search string is estimated as low, when the number of relevant documents in the set of documents corresponding to the given search string is more than the probability threshold. The probability of novelty of the subject-matter is estimated, wherein the probability of novelty of the starting document is estimated as low when the number of relevant documents corresponding to the given search string is more than the probability threshold. In an embodiment, the probability of novelty of the starting document is estimated, wherein the probability of novelty of the starting document is estimated as low when the mathematically normalized value assigned to the given search string is more than the probability threshold. In an example, a researcher has an idea for a subject-matter (starting document), wherein the user wants an estimation of probability of novelty of the idea for the subject-matter. The user inputs the keywords related to its subject-matter. The keywords input by the user are 'car', 'engine' and 'hydrogen'. The plurality of search strings generated are 'car', 'engine', 'hydrogen', 'car, engine', 'engine, hydrogen', 'car, hydrogen' and 'car, engine, hydrogen'. Suppose the number of documents corresponding to the respective plurality of search strings are 20,000, 16,000, 8,000, 10,000, 300, 500 and 20 respectively. The probability threshold determined is suppose 100. Therefore, for a subject-matter comprising the plurality of search strings 'car, engine, hydrogen', the probability of novelty will be high. Therefore, if the researcher uses the keywords 'car', 'engine' and 'hydrogen', the probability of the subject-matter being novel will be high. Moreover, if the researcher uses the any one or any two of the keywords 'car', 'engine' and 'hydrogen', the probability of the subject-matter being novel will be low. In an embodiment, referring to the abovementioned example, Suppose, a mathematically normalized value corresponding to the respective plurality of search strings are 1, 0.8, 0.4, 0.5, 0.015, 0.025 and 0.001. The probability threshold determined is suppose 0.002. Therefore, for a subject-matter comprising the plurality of search strings 'car, engine, hydrogen', the probability of novelty will be high. Therefore, if the researcher uses the keywords 'car', 'engine' and 'hydrogen', the probability of the subject-matter being novel will be high. Moreover, if the researcher uses the any one or any two of the keywords 'car', 'engine' and 'hydrogen', the probability of the subject-matter being novel will be low.

Optionally, the method comprises identifying a plurality of synonyms relating to the keywords in the set of keywords, wherein each of the plurality of search strings comprises at least one of: a keyword from the set of keywords, a synonym of the keyword. The synonyms relating to a keyword of the set of keywords are identified. Moreover, the plurality of search strings is generated, wherein the plurality of search strings comprises a keyword from the set of keywords, the synonym of the keyword or a combination thereof. In an example, a set of keywords comprise the keywords 'wheel', 'spike' and 'ground'. The synonyms corresponding to the keyword 'wheel' are 'rotate' and 'turn'. Furthermore, the synonyms corresponding to the keyword 'spike' are 'barb' and 'spear'. Moreover, the synonyms corresponding to the keyword 'ground' are 'earth' and 'land'. Therefore, the plurality of search strings generated includes 'wheel', 'spike', 'ground', 'rotate', 'turn', 'barb', 'spear', 'earth', 'land', 'wheel, spike', 'spike, ground', 'spike, ground, rotate', 'rotate, turn, wheel' and so forth. It will be appreciated that the number of plurality of search-strings depends upon a number of keywords in the set of keywords and the plurality of synonyms relating to the keywords in the set of keywords.

Optionally, the method comprises identifying a technical field of the starting document. The starting document is related to at least one technical field, wherein the technical field is a domain dedicated to a specific technical subject-matter. For example, the technical field may be engineering, medical, biomedical and so forth. Furthermore, the engineering technical field may be categorized into mechanical, civil, electrical, computer science and so forth. The technical field related to the starting document is identified based on the textual data received from the user or the set of keywords received from the user. In an embodiment, the technical field of the starting document may be received from the user itself. In an example, a textual data related to a starting document as received from a user is 'The present disclosure seeks to provide a method of adapting an internal combustion engine vehicle chassis to make it suitable for an electrical vehicle drive train'. The technical fields related to the abovementioned textual data may be mechanical engineering, electrical engineering and so forth. In another example, the technical fields may be entered by the user itself such as biomedical, chemical engineering, biotechnology and so forth.

Furthermore, the method comprises determining a word frequency distribution for the technical field. The identified technical field comprises a plurality of words therein. The determination of the word frequency distribution of each of the word of the plurality of words depends upon a popularity i.e. a frequency of occurrence of each of the word within the technical field. Notably, the word frequency distribution comprises a plurality of words from a plurality of patent literatures as well as from a plurality of non-patent literatures dedicated to a specific technical field (collectively termed as prior art). The term "patent" refers to a territorial right to prevent others from commercially exploiting an invention, granted to an inventor or a successor of the inventor in rights in exchange for a public disclosure of the invention. Furthermore, the patent is regarded as a specific type of intellectual property right, and is granted for a limited period of time. Moreover, the term "patent literature" refers to relevant data that comprise research and development and test results that have been applied or confirmed to be a discovery, a utility model and an industrial design as well as a published or an unpublished document of materials. Furthermore, the term "non-patent literature" refers to any technical document that is neither a patent nor a patent application. The non-patent literature may comprise research papers, thesis work and so forth. Moreover, a singular form or a plural form of each of the word is taken into consideration for the determination of the word frequency distribution. In an example, a word 'tire' occurs in a plurality of patent literatures and a plurality of non-patent literatures related to a technical field of mechanical engineering. Furthermore, the word 'tire' occurs 20,000 times in a technical field, whereas a word 'tires' occur 5,000 times in the technical field. The frequency of occurrence of the keyword 'tire' in the technical field is considered as a sum of both the words 'tire' and 'tires' i.e. the frequency of occurrence of the keyword 'tire' in the technical field is considered as 25,000.

Optionally, the method comprises determining the word frequency distribution based on Zipf's Law. Notably, the Zipf's Law states that a frequency of occurrence of a word is inversely proportional to a rank of the word. Therefore, a most frequent word occurs approximately twice as often as a second most frequent word, three times as often as a third most frequent word and so forth. The word frequency distribution may be determined based on the Zipf's Law.

Furthermore, the method comprises assigning a rank to each of the keyword based on the word frequency distribution. The word frequency distribution is determined in order to assign the rank to each of the keyword of the set of keywords. A keyword that occurs commonly in the technical field i.e. a keyword having a high frequency of occurrence in the technical field is assigned a rank lower than a keyword that does not occur commonly in the technical field i.e. a keyword having a low frequency of occurrence in the technical field. In an example, for a technical field named 'automobiles', a word 'car' is the most frequently occurring word, a word 'wheel' is the second most occurring word and a word 'engine' is the third most occurring word. Therefore, in a word frequency distribution, the word 'car' is assigned a rank 3, the word 'wheel' is assigned a rank 2 and the word 'engine' is assigned a rank 1. Moreover, the set of keywords obtained from the textual data are searched for in the word frequency distribution of the words of the technical field. Each of the keyword of the set of keywords is assigned a rank based on a position of each of the keyword in the word frequency distribution.

Optionally, the method comprises determining a mathematically normalised value for each of the search strings, based on the number of documents in the set of documents corresponding to the search string. The difference between the number of documents received by a search string of the plurality of search strings and another search string of the plurality of search strings may be substantially high. In an example, a number of documents corresponding to a search string comprising a keyword 'computer' are 1,597,652. Moreover, a number of documents corresponding a search string comprising the keywords 'computer', 'blockchain', 'neural' and 'machine-learning' are 18. Therefore, the mathematically normalized value is assigned to each of plurality of search strings to normalize a difference in values of the plurality of search strings. In an embodiment, the determination of the mathematically normalized value for each of the plurality of search strings, based on the number of documents in the set of documents may be done by using standard normalization techniques such as a standard score normalization technique, a student's t-statistic normalization technique, a studentized residual normalization technique, a standardized moment normalization technique, a coefficient of variation normalization technique, a feature scaling normalization technique and so forth.

The present disclosure also relates to the system as described above. Various embodiments and variants disclosed above apply mutatis mutandis to the system.

Optionally, in the system, the server arrangement is operable to iteratively: select a reference-text from the document; generate a search-string by using a plurality of keywords selected from the reference-text using at least one first machine learning algorithm and at least one search-operator derived for the plurality of keywords using at least one second machine learning algorithm; perform a search among the plurality of documents using the search-string to fetch a set of documents; determine a number of relevant documents in each of the set of documents; derive a reference-identifier distribution, corresponding to the at least one reference-identifier associated with the document, for the number of relevant documents; and corelate the at least one reference-identifier associated with the starting document with the reference-identifier distribution to determine a performance-score for the system, until the performance-score exceeds the predetermined threshold, and wherein at each iteration, a different reference-text within the document is selected.

Optionally, in the system, the server arrangement is operable to iteratively: receive a starting document, having at least one reference-identifier associated with the document; select a reference-text from the starting document; generate a search-string by using a plurality of keywords selected from the reference-text using at least one first machine learning algorithm and at least one search-operator derived for the plurality of keywords using at least one second machine learning algorithm; perform a search among the plurality of documents using the search-string to fetch a set of documents; determine a number of relevant documents in each of the set of documents; derive a reference-identifier distribution, corresponding to the at least one reference-identifier associated with the document, for the number of relevant documents; and corelate the at least one reference-identifier associated with the document with the reference-identifier distribution to determine a performance-score for the system, until the performance-score exceeds the predetermined threshold, and wherein at each iteration, a different document is obtained from the plurality of documents, having at least one reference-identifier associated with the document.

In an aspect, embodiments of the present disclosure provides a software product recorded on machine-readable non-transient (non-transitory) data storage media, wherein the software product is executable upon computing hardware for implementing the aforementioned method; in other words, the present disclosure provides a computer program product comprising a non-transient (non-transitory) computer-readable storage medium having computer-readable instructions stored thereon, the computer-readable instructions being executable by a computerized device comprising processing hardware to execute a method for training a system to perform text-based search among a plurality of documents.

DETAILED DESCRIPTION OF THE DRAWINGS

Figure 1:
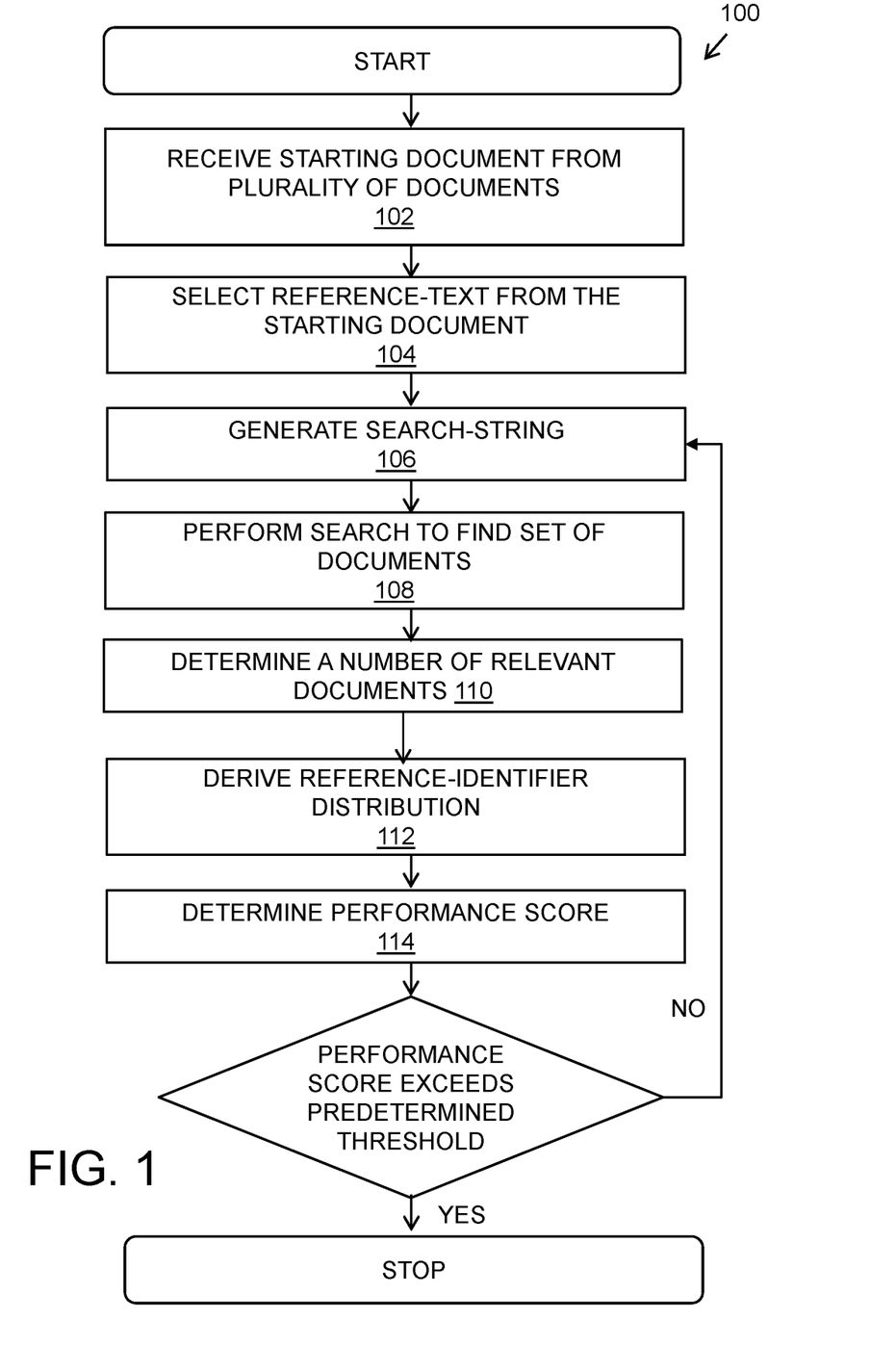
FIG. 1 is a schematic illustration of a steps of a method for training a system to perform text-based search among a plurality of documents, in accordance with an embodiment of the present disclosure.

Referring to FIG. 1, illustrated are steps of a method 100 for training a system to perform text-based search among a plurality of documents, in accordance with an embodiment of the present disclosure. At a step 102, a starting document is received, having at least one reference-identifier associated with the document. At a step 104, a reference-text is selected from the starting document. At a step 106, a search-string is generated by using: a plurality of keywords selected from the reference-text using at least one first machine learning algorithm, and at least one search-operator derived for the plurality of keywords using at least one second machine learning algorithm. At a step 108, a search is performed among the plurality of documents using the search string to fetch a set of documents. At a step 110, determine a number of relevant documents in each of the set of documents. At a step 112, a reference-identifier distribution is derived corresponding to the at least one reference-identifier associated with the document, for the number of relevant documents. At a step 114, the at least one reference-identifier associated with the starting document is corelated with the reference-identifier distribution to determine a performance-score for the system. At least the steps 106 to 114 are performed iteratively until the performance-score exceeds a predetermined threshold, wherein at each iteration a different search-string is generated at the step 106.

The steps 102 to 114 are only illustrative and other alternatives can also be provided where one or more steps are added, one or more steps are removed, or one or more steps are provided in a different sequence without departing from the scope of the claims herein.

In an example, the steps (b) to (g) may be iteratively performed until the performance-score exceeds the predetermined threshold, and wherein at each iteration, a different reference-text within the document is selected at the step (b).

In another example, the steps (a) to (g) may be iteratively performed until the performance-score exceeds the predetermined threshold, and wherein at each iteration, a different document is obtained at the step (a).

Figure 2:
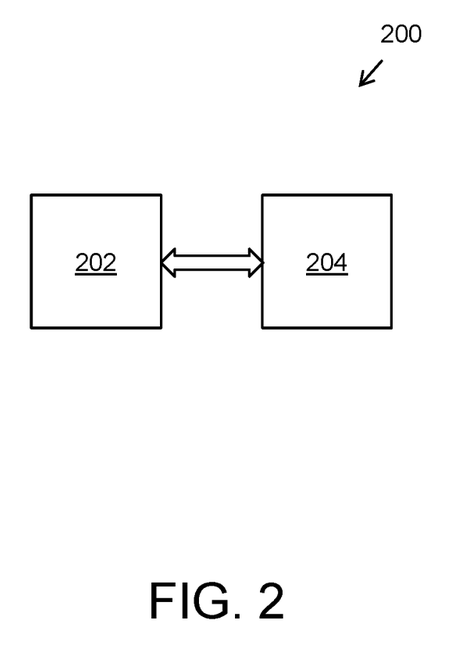
FIG. 2 is a block diagram of a system to perform text-based search among a plurality of documents, in accordance with an embodiment of the present disclosure.

Referring to FIG. 2, illustrated is block diagram of a system 200 to perform text-based search among a plurality of documents is implemented, in accordance with an embodiment of the present disclosure. The system 200 comprises a database 202 having the plurality of documents. Furthermore, system 200 comprises a server arrangement 204 operable to: receive the starting document, having at least one reference-identifier associated with the document; select the reference-text from the starting document; generate a search-string by using a plurality of keywords selected from the reference-text using at least one first machine learning algorithm, and at least one search-operator derived for the plurality of keywords using at least one second machine learning algorithm; perform a search among the plurality of documents using the search string to fetch a set of documents; determine a number of relevant documents in each of the set of documents; derive a reference-identifier distribution, corresponding to the at least one reference-identifier associated with the document, for the number of relevant documents; and corelate the at least one reference-identifier associated with the starting document with the reference-identifier distribution to determine a performance-score for the system. Moreover the at least the steps, generating a search-string by using a plurality of keywords selected from the reference-text using at least one first machine learning algorithm, and at least one search-operator derived for the plurality of keywords using at least one second machine learning algorithm; performing a search among the plurality of documents using the search string to fetch a set of documents; determine a number of relevant documents in each of the set of documents; deriving a reference-identifier distribution, corresponding to the at least one reference-identifier associated with the document, for the number of relevant documents; and corelating the at least one reference-identifier associated with the starting document with the reference-identifier distribution to determine a performance-score for the system, are performed iteratively until the performance-score exceeds a predetermined threshold. As shown, in the system 200, the database 202 is communicably coupled with the server arrangement 204 via a communication network (not shown).

It will be appreciated that FIG. 2 is merely an example, which should not unduly limit the scope of the claims herein. It is to be understood that the specific designation for the system 200 is provided as an example and is not to be construed as limiting the system 200 to specific numbers, types, or arrangements of user devices, servers, sources of input data, and communication networks. A person skilled in the art will recognize many variations, alternatives, and modifications of embodiments of the present disclosure.

Figure 3:
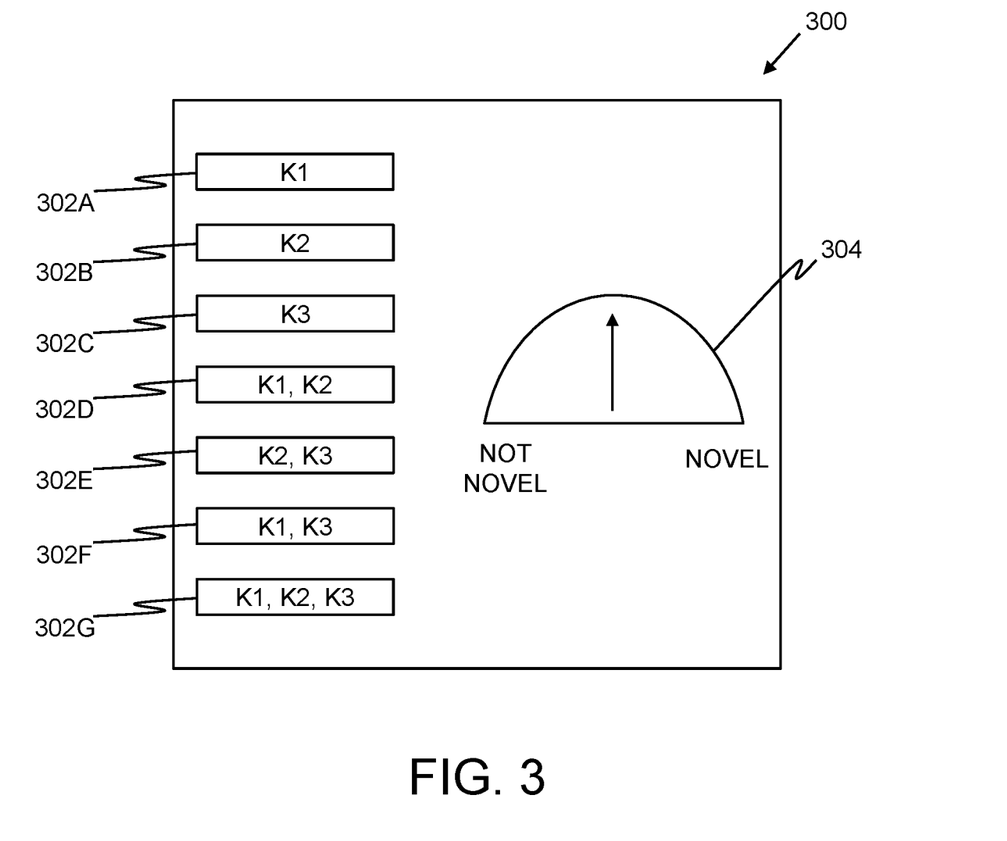
FIGS. 3 and 4 are illustrations of exemplary graphical user interfaces for providing a list of search strings and for providing an estimation of probability of novelty related to each of the search strings, in accordance with an embodiment of the present disclosure.

Referring to FIG. 3, there is shown a graphical user interface 300 for providing the list of plurality of search strings 302A-G (such as comprising keywords K1, K2, K3 and possible combinations of the keywords K1, K2 and K3) and for providing an estimation of probability of novelty related to each of the plurality of search strings to a user (such as the user 204 in FIG.2), in accordance with an exemplary embodiment of the present disclosure. FIG. 3 depicts a novelty-meter 304, wherein the novelty-meter 304 indicates an estimation of probability of novelty corresponding to the plurality of search strings 302A-G. A user (such as the user 204 in FIG.2) may select any of the search strings 302A, 302B, 302C, 302D, 302E, 302F or 302G from the list of plurality of search strings 302A-G. The estimation of probability of novelty corresponding to the selected search string from the list of plurality of search strings 302A-G is indicated by the novelty-meter 304 such that a pointer of the novelty-meter 304 point towards a text displayed as "not novel" when the estimation of probability of novelty is low and the pointer of the novelty-meter 304 point towards a text displayed as "novel" when the estimation of probability of novelty is high corresponding to the selected search string.

Figure 4:
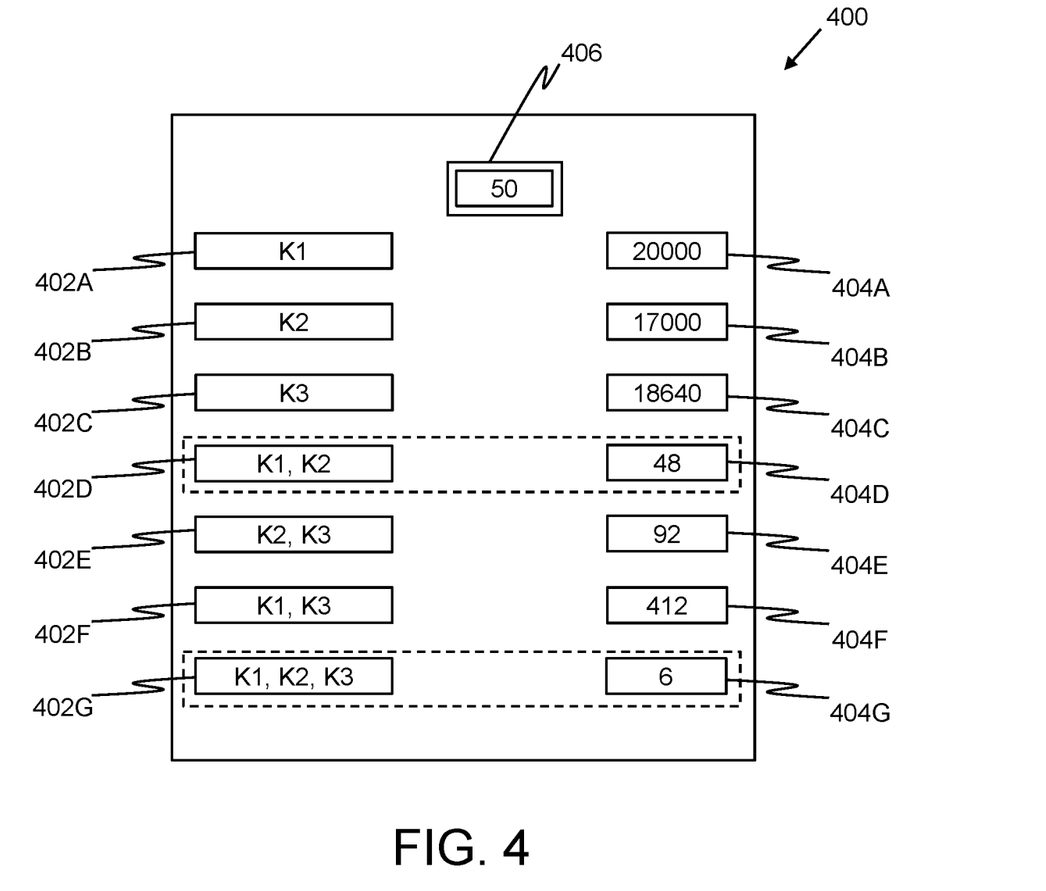

Referring to FIG. 4, there is shown a graphical user interface 400 for providing the list of plurality of search strings 402A-G (such as the list of plurality of search strings 302A-G of FIG.3) and for providing an estimation of probability of novelty related to each of the plurality of search strings to a user, in accordance with an exemplary embodiment of the present disclosure. The graphical user interface 400 provides the user with a plurality of fields 404A, 404B, 404C, 404D, 404E, 404F and 404G displaying the number of the set of documents identified corresponding to the list of plurality of search strings 402A-G. Furthermore, the graphical user interface 400 in FIG.4 displays a field 406 depicting the user (a value of the probability threshold in strings of the number of documents. Additionally, the search strings that qualify as having a probability of novelty as high are highlighted. In an example (referring to FIG.4), the probability threshold is 50. The search string comprising the keywords K1, K2 has an identified number of set of documents as 48 i.e. less than the probability threshold. Moreover, the search string comprising the keywords K1, K2 and K3 has an identified number of set of documents as 6 i.e. less than the probability threshold. Therefore, the search string comprising the keywords K1, K2 and the search string comprising the keywords K1, K2 and K3 are highlighted and shown to the user.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for training a system to perform text-based search among a plurality of documents, wherein each document comprises text having at least one reference-identifier, the method comprising:
   (a) receiving a starting document having at least one reference-identifier associated with the starting document;
   (b) selecting a reference-text from the starting document;
   (c) generating a search-string by using-a plurality of keywords selected from the reference-text using at least one first machine learning algorithm, and
   at least one search-operator derived for the plurality of keywords using at least one second machine learning algorithm;
   (d) performing a search among the plurality of documents using the search-string to fetch a set of documents;
   (e) determining a number of relevant documents in each of the set of documents;
   (f) deriving a reference-identifier distribution for the number of relevant documents, wherein each of the number of relevant documents has at least one reference-identifier associated therewith; and
   (g) correlating the at least one reference-identifier associated with the starting document with the reference-identifier distribution to determine a performance-score for the system, wherein at least the steps (c) to (g) are performed iteratively until the performance-score exceeds a predetermined threshold, wherein at each iteration a different search-string is generated at the step (c).

2. The method according to claim 1, wherein the different search-string is generated by at least one of:
   selecting at least one different keyword from the plurality of keywords by the first machine learning algorithm, or
   altering the at least one search-operator by the second machine learning algorithm.

3. The method according to claim 1, wherein in addition to steps (c) to (g), steps (b) is performed iteratively until the performance-score exceeds the predetermined threshold, and wherein at each iteration, a different reference-text within the document is selected at step (b).

4. The method according to claim 1, wherein in addition to steps (c) to (g), steps (a) to (b) are performed iteratively until the performance-score exceeds the predetermined threshold, and wherein at each iteration, a different starting document is received at the step (a).

5. The method according to claim 1, wherein each of the plurality of documents further comprises a plurality of sections having the text distributed there-along, wherein the plurality of sections comprises at least one reference-section and at least one search-section.

6. The method according to claim 5, wherein at the step (b), the reference-text is selected from at least one reference-section of the plurality of sections of the document.

7. The method according to claim 5, wherein at the step (d), the search is performed in at least one search-section of the plurality of sections among the plurality of documents.

8. The method according to claim 5, wherein at the step (d), performing the search comprises selecting a different search-section of the plurality of sections among the plurality of documents to fetch the set of relevant documents.

9. The method according to claim 1, wherein the performance-score is determined based on at least one of:
a frequency of occurrence of the at least one reference-identifier associated with the document in the reference-identity distribution, or
a position of the at least one reference-identifier associated with the document in the reference-identity distribution.

10. The method according to claim 1, further comprising
(h) implementing at least one action, based upon the performance-score of the system.

11. The method according to claim 10, wherein the at least one action comprises at least one of: allocating a service provider to provide a specialized service pertaining to a given document, determining at least one reference-identifier associated with a given document, determining a set of relevant keywords for a given document.

12. The method according to claim 1, further comprising:
estimating probability of novelty of the starting document by:
determining a probability threshold, wherein the probability threshold is a measure of the probability of novelty of the starting document;
estimating the probability of the novelty of the starting document based on each of the search-strings, wherein the novelty of the starting document based on a given search-string is estimated as:
high, when the number of relevant documents in the set of documents corresponding to the given search-string is less than or equal to the probability threshold, or
low, when the number of relevant documents in the set of documents corresponding to the given search-string is more than the probability threshold.

13. The method according to claim 1, wherein the method comprises identifying a plurality of synonyms relating to the keywords in the set of keywords, wherein each of the plurality of search-strings comprises at least one of: a keyword from the set of keywords, a synonym of the keyword.

14. The method according to claim 1, wherein the method comprises
identifying a technical field of the starting document;
determining a word frequency distribution for the technical field;
assigning a rank to each of the keyword based on the word frequency distribution;
generating the search-strings based on the ranks of the keywords.

15. The method according to claim 14, wherein the method comprises determining the word frequency distribution based on Zipf's Law.

16. The method according to claim 1, wherein the method comprises determining a mathematically normalised value for each of the plurality of search-strings, based on the number of documents in the set of documents corresponding to the search-string.

17. The method according to claim 12, wherein the probability threshold is determined by employing machine learning algorithms.

18. The method according to claim 1, wherein the method comprises generating the plurality of search strings further using at least one of: Boolean operators, proximity operators, exact operator and truncation and wildcard operator.

19. A system to perform text-based search among a plurality of documents, wherein each document comprises text having at least one reference-identifier, the system comprising:
a database having the plurality of documents; and
a server arrangement configured to:
(i) receive a starting document having at least one reference-identifier associated with the document,
(ii) select a reference-text from the starting document,
(iii) generate a search-string by using:
a plurality of keywords selected from the reference-text using at least one first machine learning algorithm, and
at least one search-operator derived for the plurality of keywords using at least one second machine learning algorithm,
(iv) perform a search among the plurality of documents using the search-string to fetch a set of documents,
(v) determine a number of relevant documents in each of the set of documents;
(vi) derive a reference-identifier distribution for the number of relevant documents, wherein each of the number of relevant documents has at least one reference-identifier associated therewith; and
(vii) correlate the at least one reference-identifier associated with the starting document with the reference-identifier distribution to determine a performance-score for the system, wherein at least the steps (iii) to (vii) are performed iteratively until the performance-score exceeds a predetermined threshold, wherein at each iteration a different search-string is generated at the step (iii).

20. The system according to claim 19, wherein in addition to steps (iii) to (vii), the server arrangement is configured to perform steps (ii) iteratively until the performance-score exceeds the predetermined threshold, and wherein at each iteration, a different reference-text within the document is selected at step (ii).

21. The system according to claim 19, wherein in addition to steps (iii) to (vii), the server arrangement is configured to perform steps (i) to (ii) iteratively until the performance-score exceeds the predetermined threshold, and wherein at each iteration, a different starting document is received at the step (i).

22. The system according to claim 19, wherein the server arrangement is further configured to (viii) estimate probability of novelty of the starting document, the server arrangement is configured to:
determine a probability threshold, wherein the probability threshold is a measure of the probability of novelty of the starting document;
estimate the probability of the novelty of the starting document based on each of the search-strings, wherein the novelty of the starting document based on a given search-string is estimated as
high, when the number of relevant documents in the set of documents corresponding to the given search-string is less than or equal to the probability threshold, or
low, when the number of relevant documents in the set of documents corresponding to the given search-string is more than the probability threshold.

23. The system according to claim 19, wherein the server arrangement is configured to identify a plurality of synonyms relating to the keywords in the set of keywords, wherein each of the plurality of search-strings comprises at least one of: a keyword from the set of keywords, a synonym of the keyword.

24. The system according to claim 19, wherein the server arrangement is configured to:
   identify a technical field of the starting document;
   determine a word frequency distribution for the technical field;
   assign a rank to each of the keyword based on the word frequency distribution;
   generate the search-strings based on the ranks of the keywords.

25. The system according to claim 24, wherein the server arrangement is configured to determine the word frequency distribution based on Zipf s Law.

26. The system according to claim 22, wherein the server arrangement is configured to employ machine learning algorithms to determine the probability threshold.

27. The system according to claim 19, wherein the server arrangement is configured to determine a mathematically normalised value for each of the plurality of search strings, wherein the server arrangement is configured to generate the plurality of search strings further using at least one of: Boolean operators, proximity operators, exact operator and truncation and wildcard operator.

28. A computer programs product comprising a non-transitory machine-readable media including machine readable instructions, which when executed upon computing hardware are configured to implement the method of claim 1.

* * * * *